(12) United States Patent
Cummings et al.

(10) Patent No.: US 6,724,588 B1
(45) Date of Patent: *Apr. 20, 2004

(54) POWER SUPPLY SELECTOR

(75) Inventors: John A. Cummings, Round Rock, TX (US); John J. Breen, III, Harker Heights, TX (US)

(73) Assignee: Dell USA L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/401,219

(22) Filed: Sep. 22, 1999

(51) Int. Cl.[7] ............................................. H02H 7/00
(52) U.S. Cl. ............................ 361/18; 361/58; 361/78; 361/90
(58) Field of Search ....................... 361/18, 93.1, 115, 361/58, 78, 90

(56) References Cited

U.S. PATENT DOCUMENTS

| | | | |
|---|---|---|---|
| 5,504,907 A | 4/1996 | Stewart et al. | 395/750 |
| 5,519,261 A | 5/1996 | Stewart | 307/87 |
| 5,545,935 A | 8/1996 | Stewart | 307/150 |
| 5,576,609 A | 11/1996 | Brown et al. | 320/30 |
| 5,592,394 A | 1/1997 | Wiscombe | 364/492 |
| 5,818,200 A | * 10/1998 | Cummings et al. | 320/116 |

OTHER PUBLICATIONS

John Cummings and Barry Kates; "Adaptive Multiple Battery Charging Apparatus"; Jan. 22, 1999; U.S. Application No.: 09/236,165; 21 Pages of Specification. (Copy Not Enclosed).

* cited by examiner

Primary Examiner—Stephen W. Jackson
(74) Attorney, Agent, or Firm—Haynes and Boone, LLP

(57) ABSTRACT

A data processing system power supply selection device. The system power supply selector circuit can include a first make-without-break power supply selector module having a power supply input, at least one controlling power supply input, and a system power rail output substantially continuously coupled to said at least a first power supply input.

27 Claims, 3 Drawing Sheets

POWER SUPPLY SELECTOR

BACKGROUND OF THE INVENTION

1. Field of the Invention

The present invention relates, in general, to data processing system power source selection devices.

2. Description of the Related Art

Data processing systems are systems that manipulate, process, and store data and are notorious within the art. Personal computer systems, and their associated subsystems, constitute well known species of data processing systems.

One particularly popular type of personal computer system is the portable computer system (e.g., laptop, notebook, sub-notebook, and palm-held computer systems). Portable computer systems allow stand-alone computing and typically have their own power-supplies, modems, and storage devices.

In order to allow maximum flexibility of use, portable computer systems typically utilize a "mix" of different types of power supplies. For example, a portable computer system typically has at least one external power supply adapter (e.g., an AC-DC adapter, or a cigarette lighter adapter), which will allow the portable computer to be powered from an external power outlet such as an AC wall outlet, or a cigarette lighter outlet in an automobile. In addition, a portable computer system typically has at least one rechargeable battery, which serves as an internal power supply and which allows the portable computer system to be powered up and used in remote locations where no external power supplies are present.

Because it is common for user requirements to exceed battery life, most portable computer systems provide slots and circuitry to support multiple (i.e., more than one) rechargeable batteries. Thus, in a typical portable computer system, it is very likely that the portable computer system will provide slots and circuitry for at least two batteries, as well as circuitry to support at one least external power supply, such as an AC-DC adapter power supply. Because of the presence of these multiple power supplies, it is necessary to provide circuitry to select which of the multiple power supplies will be utilized to power the portable computer system. One type of power supply selection circuitry which is used in the art relies on what is known as a "break before make" architecture.

With reference now to FIG. 1, shown is a partially schematic diagram of a "break before make" architecture 101. Depicted are three power sources: AC-DC adapter power supply 100, battery A 102, and battery B 104. AC-DC adapter power supply 100 supplies power to data processing system 200 through system power rail 106 when AC-DC power switch 108 is closed. Battery A 102 supplies power to data processing system 200 through system power rail 106 when Battery A power switch 110 is closed. Battery B 104 supplies power to data processing system 200 through system power rail 106 when Battery B power switch 112 is closed.

It is accepted in the art that cross conduction between the multiple power sources AC-DC adapter power supply 100, Battery A 102, and Battery B 104, is undesirable. Accordingly, break before make architecture 101 "breaks" any existing electrical connection between a first power source and system power rail 106 before it "makes" another electrical connection between a second power source and system power rail 106, which ensures that no cross conduction between various power sources takes place.

In practice, this is achieved by control circuit 114 which controls and coordinates AC-DC power switch 108, Battery A power switch 110, and Battery B power switch 112 such that neither AC-DC adapter power supply 100, nor Battery A 102, nor Battery B 104 are ever simultaneously connected with each other (i.e., simultaneously connected with system power rail 106). When an existing connection between a first power supply and system rail 106 is "broken," and before a new connection between a second power supply and system rail 106 is established, there exists a period of time during which no power supply is connected to system power rail 106. Those skilled in the art will recognize that it is imperative that the voltage on system power rail 106 be "held up" during this instant of time. This function is provided by very large bulk capacitance 116, which serves to maintain the voltage on system power rail 106 during the period of time in which no power supply is connected to system power rail 106. Accordingly, very large bulk capacitance 116 is shown connected in parallel with data processing system 200.

The systemic functionalities and protections provided by break before make architecture 101 are desirable and necessary. However, those skilled in the art will recognize that there is tremendous space-efficiency and cost-efficiency pressure in the portable computer market. Those skilled in the art will also recognize that there is tremendous pressure in the art for constantly improved computing systems which maintain compatibility with previous generation systems.

Accordingly, it is apparent that there is a need in the art for a device, compatible with existing and previous generation systems, which provides the systemic functionalities and protections of break before make architectures and which gives a space-efficiency and cost-efficiency advantage over break before make architectures.

SUMMARY OF THE INVENTION

A system power supply selection device has been discovered, compatible with existing and previous generation systems, which provides the systemic functionalities and protections of break before make architectures, and gives a space-efficiency and cost-efficiency advantage over break before make architectures. The system power supply selection device can include a first make-without-break power supply selector module having a power supply input, at least one controlling power supply input, and a system power rail output substantially continuously coupled to said at least a first power supply input.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of a mode for carrying out embodiments described. The description is intended to be illustrative of the invention and should not be taken to be limiting.

Figure 2:
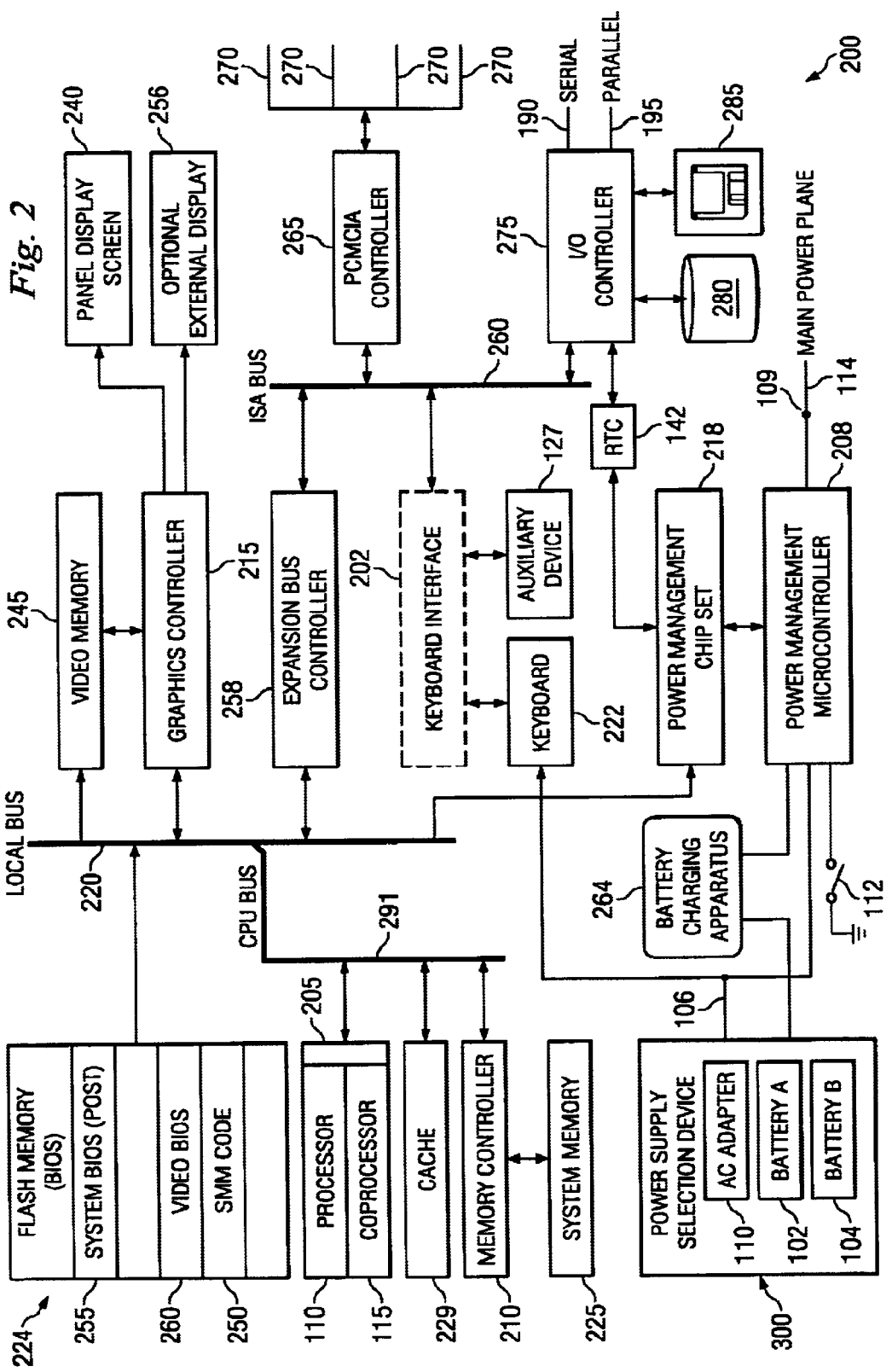
FIG. 2 depicts a perspective view of a computer system in which an embodiment of the present invention may be practiced.

Referring to FIG. 2, depicted is data processing system 200 in which an embodiment of the present invention may be practiced. Data processing system 200 includes microprocessor 205 which is coupled to cache 229 and memory controller 210 via the processor bus ("CPU bus") 291. Data processing system 200 also includes system memory 225 of dynamic random access memory ("DRAM") modules (not shown) coupled to memory controller 210. Data processing system 200 also includes Basic Input Output system ("BIOS") memory 224 coupled to local bus 220. A FLASH memory or other nonvolatile memory is used as BIOS memory 224. BIOS memory stores the system code.

A graphics controller 215 is coupled to local bus 220 and to panel display screen 240. Graphics controller 215 is coupled to video memory 245 and stores information to be displayed on panel display screen 240. Panel display 240 is typically an active matrix or passive matrix liquid crystal display ("LCD") although other display technologies may be used as well. Also shown is graphics controller 215 coupled to optional external display 256.

A bus interface controller or expansion bus controller 258 couples the local bus 220 to an expansion bus, shown as an Industry Standard Architecture ("ISA") bus, but could be represented as a Peripheral Component Interconnect ("PCI") bus. A PCMCIA ("Personal Computer Memory Card International Association") controller 265 is also coupled to the expansion bus 260 and PCMCIA devices 270. An I/O controller 275 is coupled to the expansion bus 260 as well. The I/O controller 275 interfaces to Integrated Drive Electronics ("IDE") hard drive 280 and to floppy drive 285. Keyboard Interface 202 is coupled to expansion bus 260 and further is coupled to keyboard 222 and auxiliary device 227; alternatively, keyboard 222 and auxiliary device 227 are shown to couple directly to expansion bus 260.

Data processing system 200 includes power supply selection device 300, which selects at least one power supply from AC-DC adapter power supply 100, Battery A 102, and Battery B 104 for providing power through system rail 106 to the many devices that form the data processing system 200. It will be appreciated in the art that data processing system 200 could be other types of computer systems, such as desktop, workstation, or network server computers. However, in the embodiment shown data processing system 200 is depicted as a portable or notebook computer. Thus, Battery A 102 and Battery B 104 are typically rechargeable batteries, such as Nickel Cadmium ("NiCad"), Nickel Metal Hydride ("NiMH"), or Lithium-Ion ("Li-Ion"). System power rail 106 is coupled to power management microcontroller 208 that controls the distribution of power from system power rail 106 to power planes (not shown) that supply power to different devices. Power management microcontroller 208 monitors the charge level of Battery A 102 and Battery B 104 to determine when to charge and when not to charge Battery A 102 and Battery B 104.

Power management microcontroller 208 is coupled to main power switch 212 that the user actuates to turn the computer system on and off. When power management microcontroller 208 powers down other parts the of data processing system 200 to conserve power, power management microcontroller 208 remains coupled to a source of power, through power supply rail 106.

Power management microcontroller 208 is coupled to battery charging apparatus 264. Battery charging apparatus 264 is coupled to power supply selection device 300. Battery charging apparatus 264 is capable of charging of Battery A 102 and Battery B 104. Power management microcontroller couples to power management chip set 218, which couples to Real Time Clock (RTC) 242, which couples to I/O controller 275.

Figure 3:
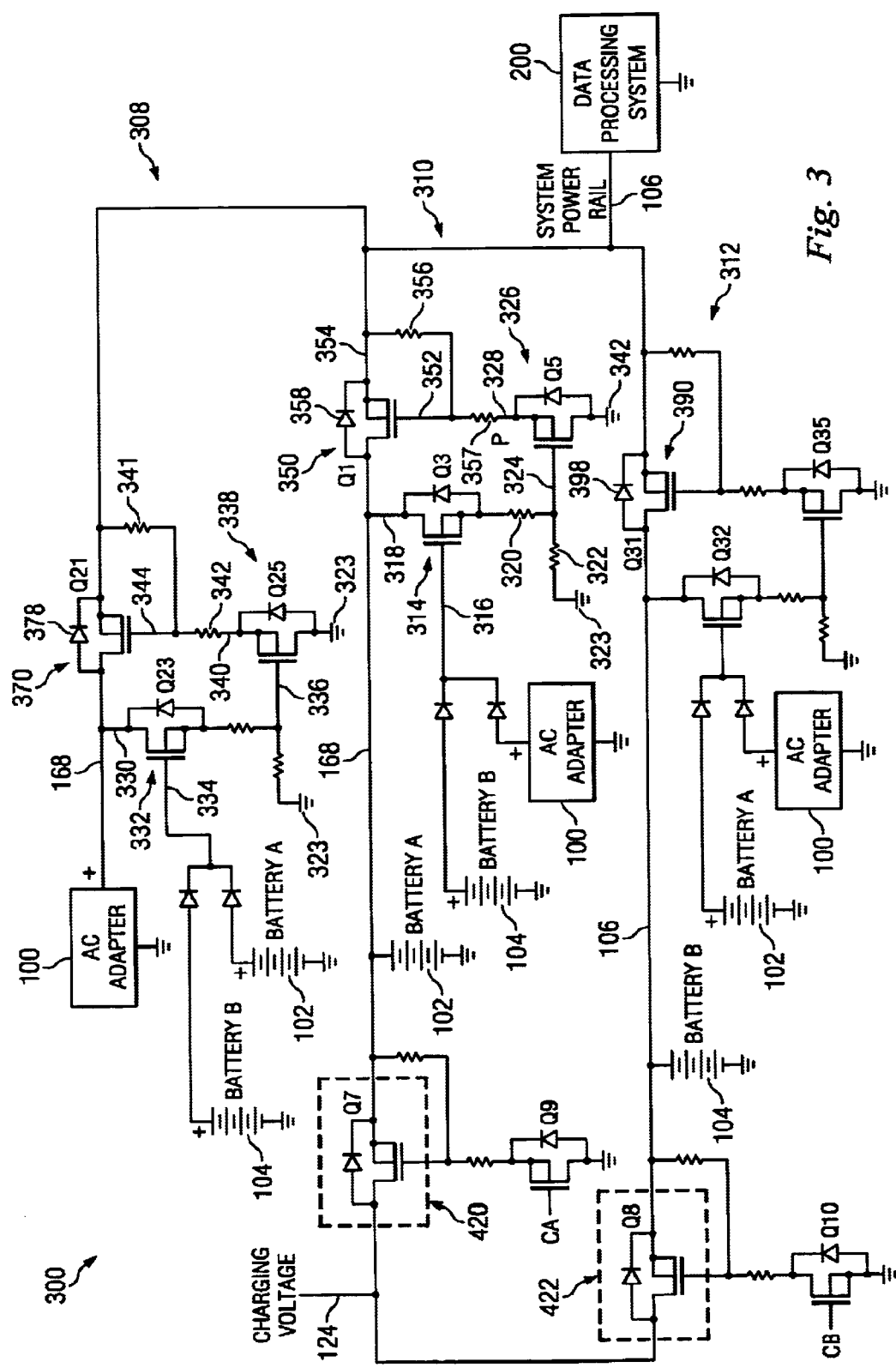
FIG. 3 depicts a partially schematic diagram showing power supply selection device 300.

FIG. 3 depicts a partially schematic diagram showing power supply selection device 300. Power supply selection device 300 selects either AC-DC adapter power supply 100 (which is coupled to a power source (not shown) such as a wall outlet DC source), Battery A 102, or Battery B 104 to supply power to system power rail 106, and hence data processing system 200. Power supply selection device 300 is comprised of three selection "modules": make-without-break AC-DC adapter power supply selector module 308, make-without-break Battery A selector module 310, and make-without-break Battery B selector module 312, which function analogous to each other, and are structured such that the power sources AC-DC adapter power supply 100, Battery A 102, or Battery B 104 with the greatest voltage or voltages (it is possible that more than one power source will be selected if power sources have equivalent voltages) will be the power supply or supplies selected to supply power to system power rail 106. As used herein, the term "make-without-break" means that connections between one or more power sources and system power rail 106 are made without breaking the connections between one or more power sources previously connected to system power rail 106. In fact, as will be seen in the following discussion, in the architecture shown the power sources are actually continuously connected with system power rail 106 through intrinsic body diodes 358, 378, 398 of P-channel FETs Q1 350, Q21 370, Q31 390, respectively.

For sake of illustration, it will be assumed initially that Battery A 102 has a voltage of 16.8 volts, AC-DC adapter power supply 100 initially has a voltage of 0 volts (e.g., is not powered up), and Battery B 104 has a voltage of 10 volts. Consequently, Battery A 102, having the highest voltage, will be selected to supply power to system power rail 106, and hence data processing system 200. This is accomplished as follows.

Since Battery A 102 is supplying power to system power rail 106, it is initially assumed (why this is true will become apparent in the following discussion) that P-Channel FET Q1 350 is switched on, and that P-Channel FET Q21 370 and P-channel FET Q31 390 are switched off. Consequently, system power rail 106 is at essentially 16.8 volts (treating the voltage drop across switched-on P-Channel FET Q1 360 as essentially zero volts). Since it is also assumed that P-Channel FET Q5 326 is also switched on (again, the following discussion will show why this is so), the voltage on gate 352 P-Channel FET Q1 350 is less positive than the voltage on source 354 of P-Channel FET Q1 350 (due to the voltage drop across resistor 356), and consequently P-Channel FET Q1 350 is turned on.

P-Channel FET Q5 326 is turned on (i.e., appears as an short circuit) because N-Channel FET Q3 314 is turned off, and thus the voltage on the gate 324 of P-Channel FET Q5 326 is essentially ground (built-in reversed diode 315 of N-Channel FET Q3 314 shows that no current flows when N-Channel FET Q3 314 is turned off), which is more negative than the voltage on source 328 of P-Channel FET Q5 326, and consequently P-Channel FET Q5 326 is turned on.

Now assume, for sake of argument, that AC-DC adapter power supply 100 has now been powered up, and has a voltage of 20 volts. Consequently, the voltage on the gate 316 of N-Channel FET Q3 314 will be more positive than the voltage on the source 318 of N-Channel FET Q3 314 and thus N-Channel FET Q3 314 will be turned on (i.e., appear as an short circuit). When N-Channel FET Q3 314 is turned on (i.e., appears as an short circuit), Battery A 102 will be connected to resistor 320 and thus current will be flowing through resistors 320, 322 to ground 323. Resistor 322 is of a size sufficient to generate considerable voltage drop across resistor 322 such that voltage drop across resistor 322, which is also voltage on the gate 324 of P-Channel FET Q5 326, will be positive relative to the voltage on source 328 of P-Channel FET Q5 326 (which, as has been described, is small but not zero when P-Channel FET Q5 326 is turned on). When the voltage on gate 324 of P-Channel FET Q5 326 becomes sufficiently positive relative to the voltage on source 328 of P-Channel FET Q5 326 (which, as has been described, is small but not zero when P-Channel FET Q5 326 is turned on), P-Channel FET Q5 326 will turn off.

When P-Channel FET Q5 326 turns off, current ceases to flow through resistors 357, 358 thereby resulting in the voltage on gate 352 of P-channel FET Q1 350 becoming essentially equal to the voltage at source 354 of P-Channel FET Q1 350, thereby turning off P-Channel FET Q1 350. With P-Channel FET Q1 350 turned off, current cannot flow back into Battery A 102 due to intrinsic body diode 402.

Those skilled in the art will recognize that there will be an interval of time—elapsing during the foregoing recounted series of events which culminate in P-Channel FET Q1 350 being turned off—when AC-DC adapter power supply 100 will be connected to system power rail 106, and during which P-Channel FET Q1 350 will still be turned on. Those skilled in the art will recognize that during this interval of time, some current will momentarily flow back into Battery A 102 while P-Channel FET Q1 350 is in the process of turning off. However, it has been found empirically that such current (typically 1.0–2.0 amps which is less than normal battery charging current) is generally not sufficient to damage the system. It should be noted that this finding goes against the teaching in the "break before make" art which indicates that any back flow of current into Battery A 102 should be avoided.

Simultaneous with the just-described process of P-Channel FET Q1 350 being turned off, P-Channel FET Q21 370 is being turned on such that AC-DC adapter power supply 100 can supply power to system power rail 106. When AC-DC adapter power supply voltage goes to 20 volts (in one implementation the AC-DC adapter power supply voltage is 20 volts; however, the aspect illustrated here is that AC-DC adapter power supply voltage is to be at some voltage higher than either the voltage on Battery A 102 or Battery B 104, and thus in other implementations AC-DC adapter power supply voltage can be some voltage other than 20 volts, so long as it exceeds the voltage on Battery A 102 or Battery B 104), voltage on source 330 of N-Channel FET Q23 332 is more positive than voltage on gate 334 of N-Channel FET Q23 332, and thus of N-Channel FET Q23 332 turns off. This will result in voltage on gate 336 of P-Channel FET Q25 338 going to essentially: ground 323. This will result in P-Channel FET Q25 338, which was previously turned off, turning on, since while P-Channel FET Q25 338 is turned off the voltage on source 340 of P-Channel FET Q25 338 is essentially equal to voltage on system power rail 106. Note that, due to internal diodes 358,378,398 of P-Channel FETs Q1 350, Q21 370, Q31 390, respectively, there will always be some voltage on system power rail 106, which reduces and/or substantially eliminates the amount of bulk capacitance required on system power rail 106.

When P-Channel FET 338 turns on, P-Channel FET Q25 becomes essentially a very low resistance path to ground 323, thereby allowing current to flow over resistors 341, 342. Since there will be some voltage drop across resistor 341 the voltage on gate 344 of P-Channel FET Q21 370 will be less positive than the voltage on source 348 of P-Channel FET Q21 370. Consequently, P-Channel FET Q21 370 will turn on, allowing AC-DC adapter power supply 100 to source power to power supply rail 106.

While the foregoing described the operations of Battery A selector module 310 and AC-DC adapter power supply selector module 308, those skilled in the art will recognize that Battery B selector module 312 functions similarly to Battery A selector module 310 and AC-DC adapter power supply selector module 308 by straightforward extension of the foregoing discussion.

Figure 1:
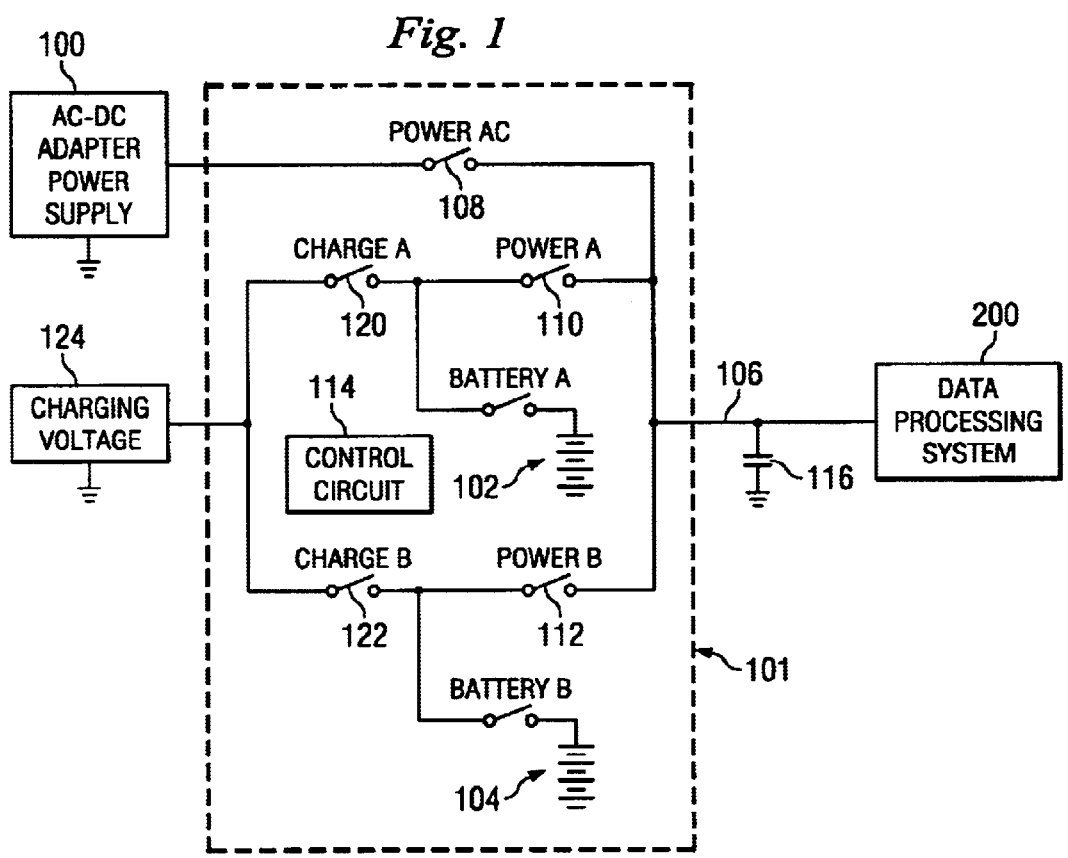
FIG. 1 shows a partially schematic diagram of a "break before make" architecture 101.

The foregoing-described architecture has several benefits, such as that the need for a break before make scheme is eliminated. In addition, notice that bulk capacitance 116 of the break before make architecture of FIG. 1 is not present in FIG. 3, since the architecture of FIG. 3 no longer has any instant of time where system power rail 106 is without power (note, though, that the absence of such bulk capacitance is not a requirement). In addition, those skilled in the art will recognize that in the actual circuit implementation of the architecture shown in FIG. 1, there are usually two FETs per each "switch" shown (e.g., AC-DC power switch 108, Battery A power switch 110, and Battery B power switch 112). Those skilled in the art will appreciate that the architecture shown in FIG. 3 requires much fewer FETs than those ordinarily utilized in "break before make" architectures such as that illustrated in FIG. 1. At the current time, a conservative estimate of savings to be obtained by incorporating the architecture of FIG. 3 into existing systems is on the order of $6/system.

Furthermore, charging switch A 120 and charging switch B 122 of FIG. 1 also typically require back-to-back Field Effect Transistors in order to ensure that no current flows from charging voltage 124 onto power rail 106. However, as can be seen in FIG. 3, because the design isolates power supplies not supplying power to system power rail 106, charging switch A 420 and charging switch B 422 can now be implemented utilizing only P-channel FET Q7 and P-channel Q8, respectively, where in the absence of the present invention each charging switch A 420 and switch B 422 typically each require at least two FETs (i.e., at least four FETs).

In addition to the foregoing listed advantages, while the foregoing has described the operation of the system wherein one of the power sources has a notably high potential, those skilled in the art will recognize that power supply selection device 300 gives rise to an inherent gain in efficiency in situations where the power sources are all at the same potential.

For example, if Battery A 102 and Battery B 104 have the same voltage potential, then the batteries will be able to share the load of system power rail 106. There will thus be an inherent gain in efficiency since the series impedance for both paths are similar, but the current is reduced. Consequently, the $I^2R$ losses are significantly reduced. This will to improve rundown times. Those skilled in the art will recognize that for some batteries this has a second order effect on the amount of power that the battery can deliver. In the art, batteries are typically rated for a C/5 discharge rate. This means the capacity of the battery in mAh/5. For example a 1500 mAh battery is rated by discharging the battery at 300 mA and it should run for around 5 hours. If the same battery were discharged at 750 mA, older technologies (batteries produced 2–3 years ago), would have a runtime that was a little shy of 2 hours. Most batteries produced today will run for about an hour at their mAh rating and start to lose capacity when the discharge rates exceed 1.5–2C.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles used to introduce claim elements.

What is claimed is:

1. A power supply selection device comprising:
   a first make-without-break power supply selector module having a power supply input,
   at least one controlling power supply input,
   a system power rail output substantially continuously coupled to said power supply input by a plurality of intrinsic body diode P-Channel Field Effect Transistors, and
   a power supply protection circuit having a protection circuit input connected to said power supply input and a protection circuit output connected to said system power rail output.

2. The power supply selection device of claim 1, wherein said power supply protection circuit having a protection circuit input connected to said power supply input and a protection circuit output connected to said system power rail output further comprises:
   an intrinsic body diode P-Channel Field Effect Transistor having a drain connected to said power supply input and a source connected to said system power rail output.

3. The power supply selection device of claim 1, wherein said power supply protection circuit having a protection circuit input connected to said power supply input and a protection circuit output connected to said system power rail output further comprises:
   protection activation circuitry connected to said power supply protection circuit.

4. The power supply selection device of claim 3, wherein said protection activation circuitry connected to said protection circuit further comprises:
   an intrinsic diode N-Channel Field Effect Transistor having a source connected to said power supply input and a gate connected to said at least one controlling power supply input;
   a drain of said intrinsic diode N-channel Field Effect Transistor connected to a gate of a first intrinsic diode P-Channel Field Effect Transistor, said first intrinsic diode P-Channel Field Effect Transistor having a drain connected to a ground; and
   a source of the first intrinsic diode P-Channel Field Effect Transistor connected to said power supply protection circuit.

5. The power supply selection device of claim 1 further comprising:
   a second make-without-break power supply selector module having
      said at least one controlling power supply input of said make-without-break power supply selector module serving as a power supply input to said second make-without-break power supply selector module,
      said power supply input of said first make-without-break power supply serving as a controlling power supply input to said second make-without-break power supply, and
      said system power rail output substantially continuously coupled to the power supply input to said second make-without-break power supply selector module.

6. The supply selection device of claim 5, wherein said system power rail output substantially continuously coupled to the power supply input to said second make-without-break power supply selector module further includes:
   a power supply protection circuit having a protection circuit input connected to the power supply input to said second make-without-break power supply selector module and a protection circuit output connected to said system power rail output.

7. The power supply selection device of claim 6, wherein said power supply protection circuit having a protection circuit input connected to the power supply input to said second make-without-break power supply selector module and a protection circuit output connected to said system power rail output further comprises:
   an intrinsic body diode P-Channel Field Effect Transistor having a drain connected to the power supply input to said second make-without-break power supply selector and a source connected to said system power rail output.

8. The power supply selection device of claim 6, wherein said power supply protection circuit having a protection circuit input connected to the power supply input to said second make-without-break power supply selector module and a protection circuit output connected to said system power rail output further comprises:

protection activation circuitry connected to said power supply protection circuit.

9. The power supply selection device of claim 8, wherein said protection activation circuitry connected to said power supply protection circuit further comprises:

an intrinsic diode N-Channel Field Effect Transistor having a source connected to the power supply input to said second make-without-break power supply selector module and a gate connected to the controlling power supply input to said second make-without-break power supply;

a drain of said intrinsic diode N-Channel Field Effect Transistor connected to a gate of a first intrinsic diode P-Channel Field Effect Transistor, said first intrinsic diode P-Channel Field Effect Transistor having a drain connected to a ground; and a source of the first intrinsic diode P-Channel Field Effect Transistor connected to said power supply protection circuit.

10. A data processing system comprising:

a system power rail coupled to the data processing system; and a first make-without-break power supply selector module having a power supply input, at least one controlling power supply input, a system power rail output substantially continuously coupled to said power supply input by a plurality of intrinsic body diode P-Channel Field Effect Transistors, and a power supply protection circuit having a protection circuit input connected to said power supply input and a protection circuit output connected to said system power rail output.

11. The data processing system of claim 10, wherein said power supply protection circuit having a protection circuit input connected to said power supply input and a protection circuit output connected to said system power rail output further comprises:

an intrinsic body diode P-Channel Field Effect Transistor having a drain connected to said power supply input and a source connected to said system power rail output.

12. The data processing system of claim 10, wherein said power supply protection circuit having a protection circuit input connected to said power supply input and a protection circuit output connected to said system power rail output further comprises:

protection activation circuitry connected to said power supply protection circuit.

13. The data processing system of claim 12, wherein said protection activation circuitry connected to said power supply protection circuit further comprises:

an intrinsic diode N-Channel Field Effect Transistor having a source connected to said power supply input and a gate connected to said at least one controlling power supply input;

a drain of said intrinsic diode N-Channel Field Effect Transistor connected to a gate of a first intrinsic diode P-Channel Field Effect Transistor, said first intrinsic diode P-Channel Field Effect Transistor having a drain connected to a ground; and a source of the first intrinsic diode P-Channel Field Effect Transistor connected to said power supply protection circuit.

14. The data processing system of claim 10, further comprising:

a second make-without-break power supply selector module having said at least one controlling power supply input of said first make-without-break power supply selector module serving as a power supply input to said second make-without-break power supply selector module, said power supply input of said first make-without-break power supply serving as a controlling power supply input to said second make-without-break power supply, and said system power rail output substantially continuously coupled to the power supply input to said second make-without-break power supply selector module.

15. The data processing system of claim 14, wherein said system power rail output substantially continuously coupled to the power supply input to said second make-without-break power supply selector module further includes:

a power supply protection circuit having a protection circuit input connected to the power supply input to said second make-without-break power supply selector module and a protection circuit output connected to said system power rail output.

16. The data processing system of claim 15, wherein said power supply protection circuit having a protection circuit input connected to the power supply input to said second make-without-break power supply selector module and a protection circuit output connected to said system power rail output further comprises:

an intrinsic body diode P-Channel Field Effect Transistor having a drain connected to the power supply input to said second make-without-break power supply selector and a source connected to said system power rail output.

17. The data processing system of claim 15, wherein said power supply protection circuit having a protection circuit input connected to the power supply input to said second make-without-break power supply selector module and a protection circuit output connected to said system power rail output further comprises:

protection activation circuitry connected to said power supply protection circuit.

18. The data processing system of claim 17, wherein said protection activation circuitry connected to said power supply protection circuit further comprises:

an intrinsic diode N-Channel Field Effect Transistor having a source connected to the power supply input to said second make-without-break power supply selector module and a gate connected to the controlling power supply input to said second make-without-break power supply;

a drain of said intrinsic diode N-Channel Field Effect Transistor connected to a gate of a first intrinsic diode P-Channel Field Effect Transistor, said first intrinsic diode P-Channel Field Effect Transistor having a drain connected to a ground; and a source of the first intrinsic diode P-Channel Field Effect Transistor connected to said power supply protection circuit.

19. The data processing system of claim 10, wherein the data processing system further comprises:

a processor;

a memory operatively coupled to said processor; and a storage device operatively coupled to said processor.

20. A method for manufacturing a power supply selection device, said method comprising:

assembling a first make-without-break power supply selector module connecting a power supply protection circuit input to a power supply input of said first make-without-break power supply selector module and connecting a power supply protection circuit output to a system power rail; and connecting a drain of an intrinsic body diode P-Channel Field Effect Transistor to the power supply input and a source of the intrinsic body diode P-Channel Field Effect Transistor to the system power rail.

21. The method of claim 20, wherein said connecting a power supply protection circuit input to a power supply input of said first make-without-break power supply selector module and a power supply protection circuit output to a system power rail further comprises:

connecting protection activation circuitry to said power supply protection circuit.

22. The method of claim 21, wherein said connecting protection activation circuitry to said power supply protection circuit further comprises:

connecting a source of an intrinsic diode N-Channel Field Effect Transistor to said power supply input and a gate of an intrinsic diode N-Channel Field Effect Transistor to at least one controlling power supply input;

connecting a drain of the intrinsic diode N-Channel Field Effect Transistor to a gate of a first intrinsic diode P-Channel Field Effect Transistor, and connecting a drain of the first intrinsic diode P-Channel Field Effect Transistor to a ground; and connecting a source of the first intrinsic diode P-Channel Field Effect Transistor to said power supply protection circuit.

23. The method of claim 22, further comprising:

assembling a second make-without-break power supply selector module.

24. The method of claim 23, wherein said assembling a second make-without-break power supply selector module further includes:

connecting a power supply protection circuit input to a power supply input of said second make-without-break power supply selector module and connecting a power supply protection circuit output to a system power rail.

25. The method of claim 24, wherein said connecting a power supply protection circuit input to a power supply input of said second make-without-break power supply selector module and connecting a power supply protection circuit output to a system power rail further comprises:

connecting a gate of an intrinsic body diode P-Channel Field Effect Transistor to the power supply input to said second make-without-break power supply selector and a source of the intrinsic body diode P-Channel Field Effect Transistor to the system power rail.

26. The method of claim 24, wherein said connecting a power supply protection circuit input to a power supply input of said second make-without-break power supply selector module and connecting a power supply protection circuit output to a system power rail further comprises:

connecting protection activation circuitry to said power supply protection circuit.

27. The method of claim 26, wherein said connecting protection activation circuitry to said power supply protection circuit further comprises:

connecting a source of an intrinsic diode N-Channel Field Effect Transistor to the power supply input to said second make-without-break power supply selector module and a gate of the intrinsic diode N-Channel Field Effect Transistor connected to at least one controlling power supply input to said second make-without-break power supply;

connecting a drain of said intrinsic diode N-Channel Field Effect Transistor to a gate of a first intrinsic diode P-Channel Field Effect Transistor, and connecting a drain of the first intrinsic diode P-Channel Field Effect Transistor connected to a ground; and connecting a source of the first intrinsic diode P-Channel Field Effect Transistor to said power supply protection circuit.

\* \* \* \* \*